No. 612,283. Patented Oct. 11, 1898.
J. C. STEELE.
BRICK CUTTING TABLE.
(Application filed Sept. 16, 1897.)
(No Model.) 5 Sheets—Sheet 3.
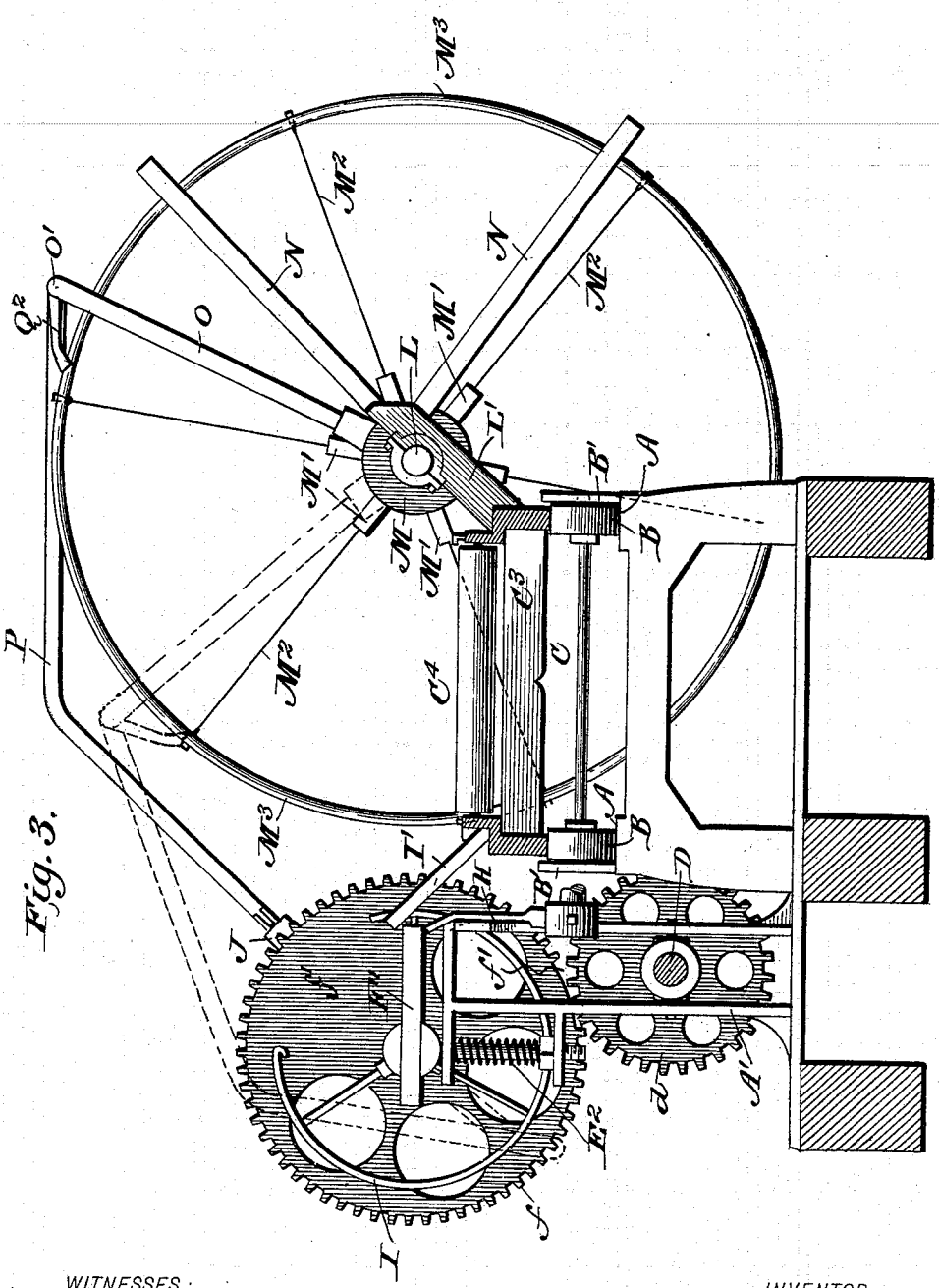
WITNESSES:
INVENTOR
J. C. Steele.
BY
ATTORNEYS.

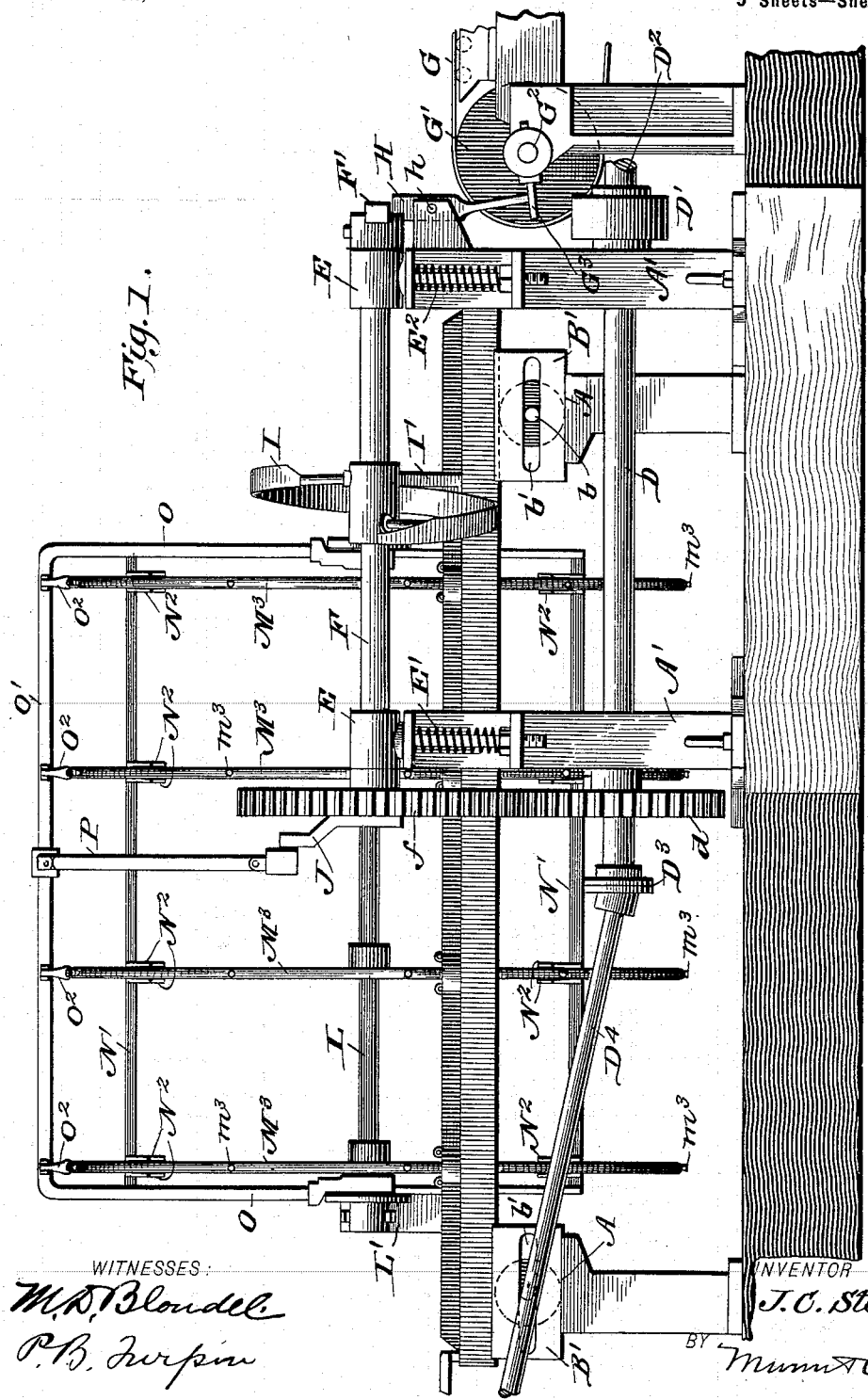

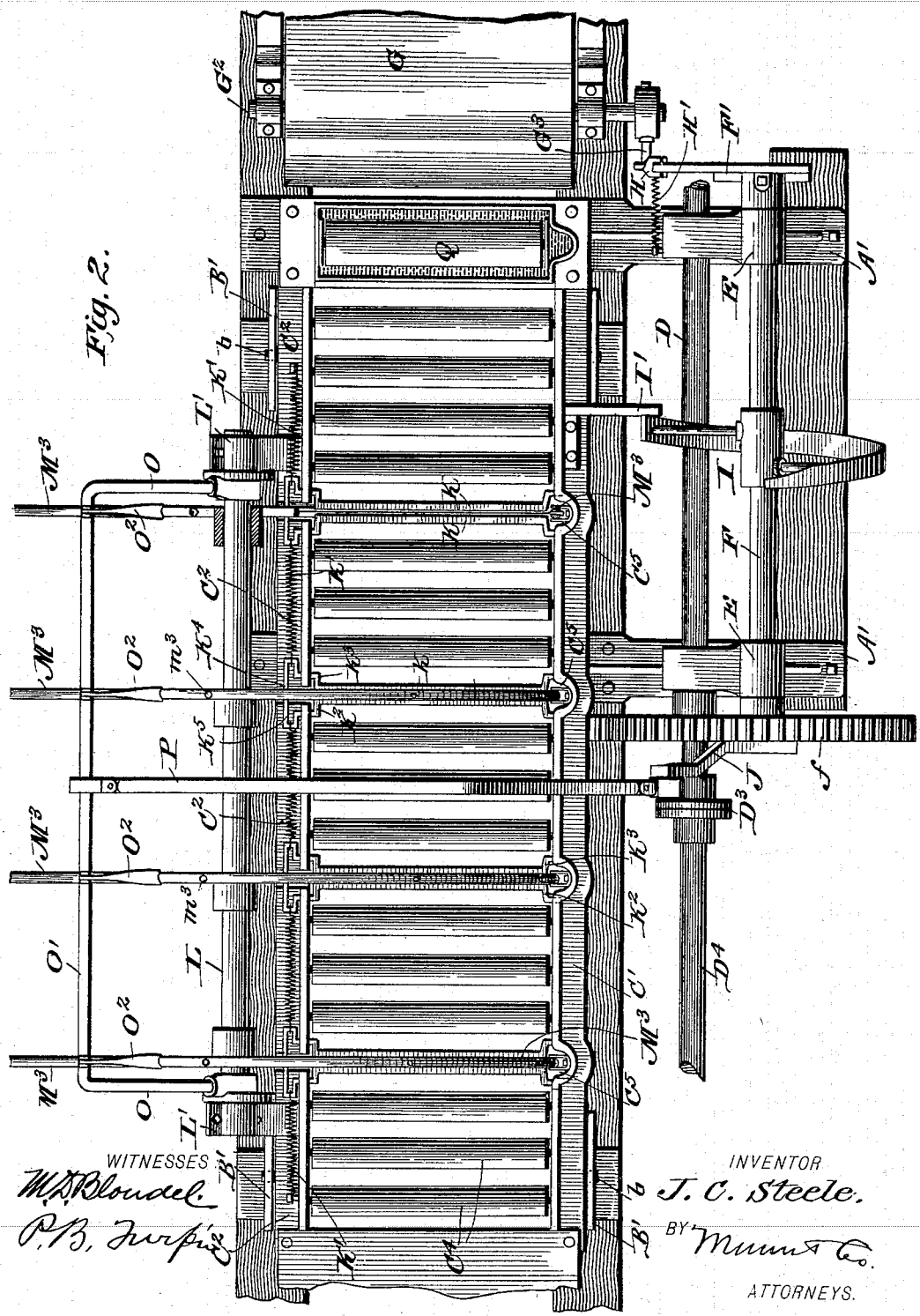

No. 612,283. Patented Oct. 11, 1898.
J. C. STEELE.
BRICK CUTTING TABLE.
(Application filed Sept. 16, 1897.)
(No Model.) 5 Sheets—Sheet 4.
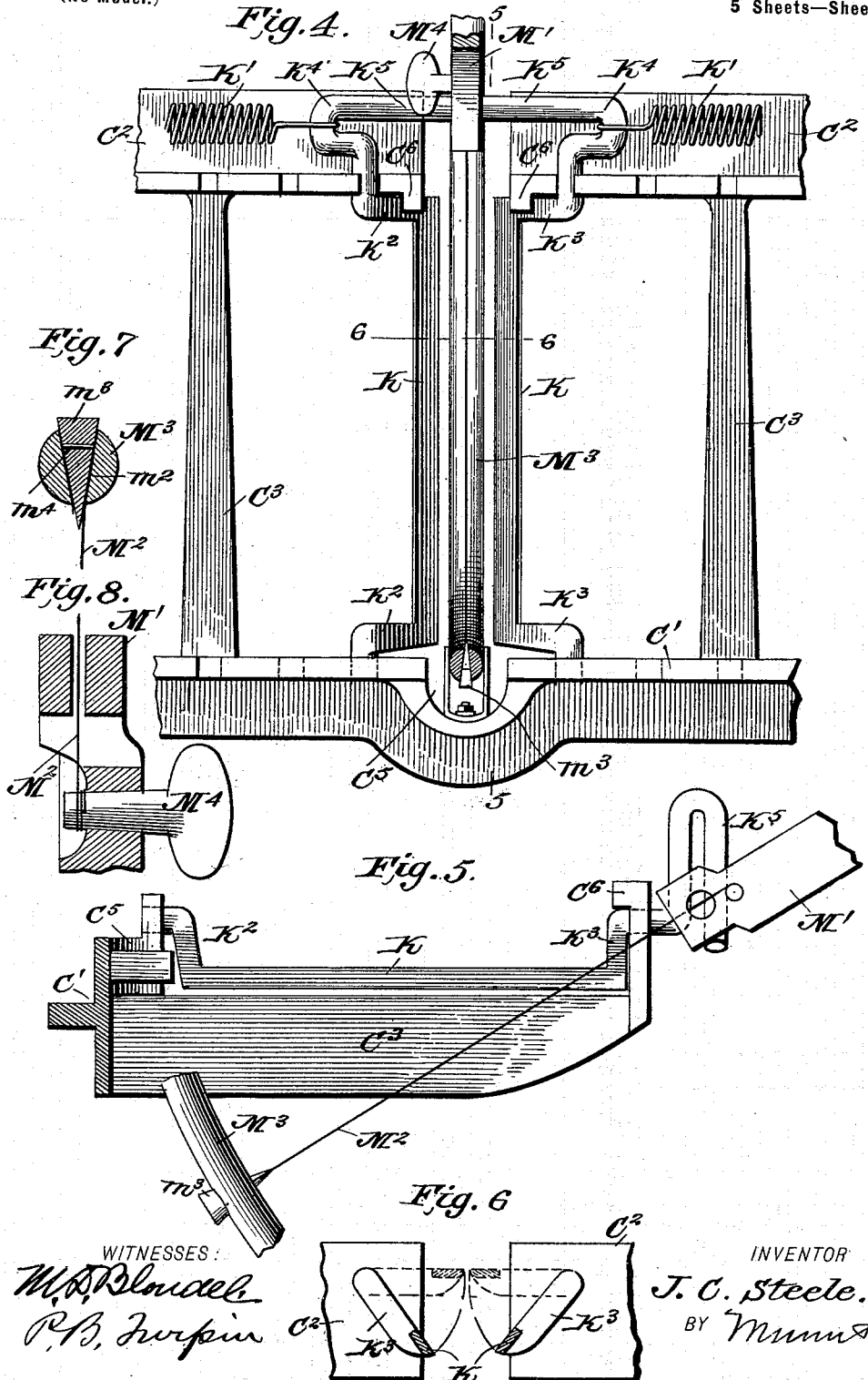

No. 612,283. Patented Oct. 11, 1898.
J. C. STEELE.
BRICK CUTTING TABLE.
(Application filed Sept. 16, 1897.)
(No Model.) 5 Sheets—Sheet 5.
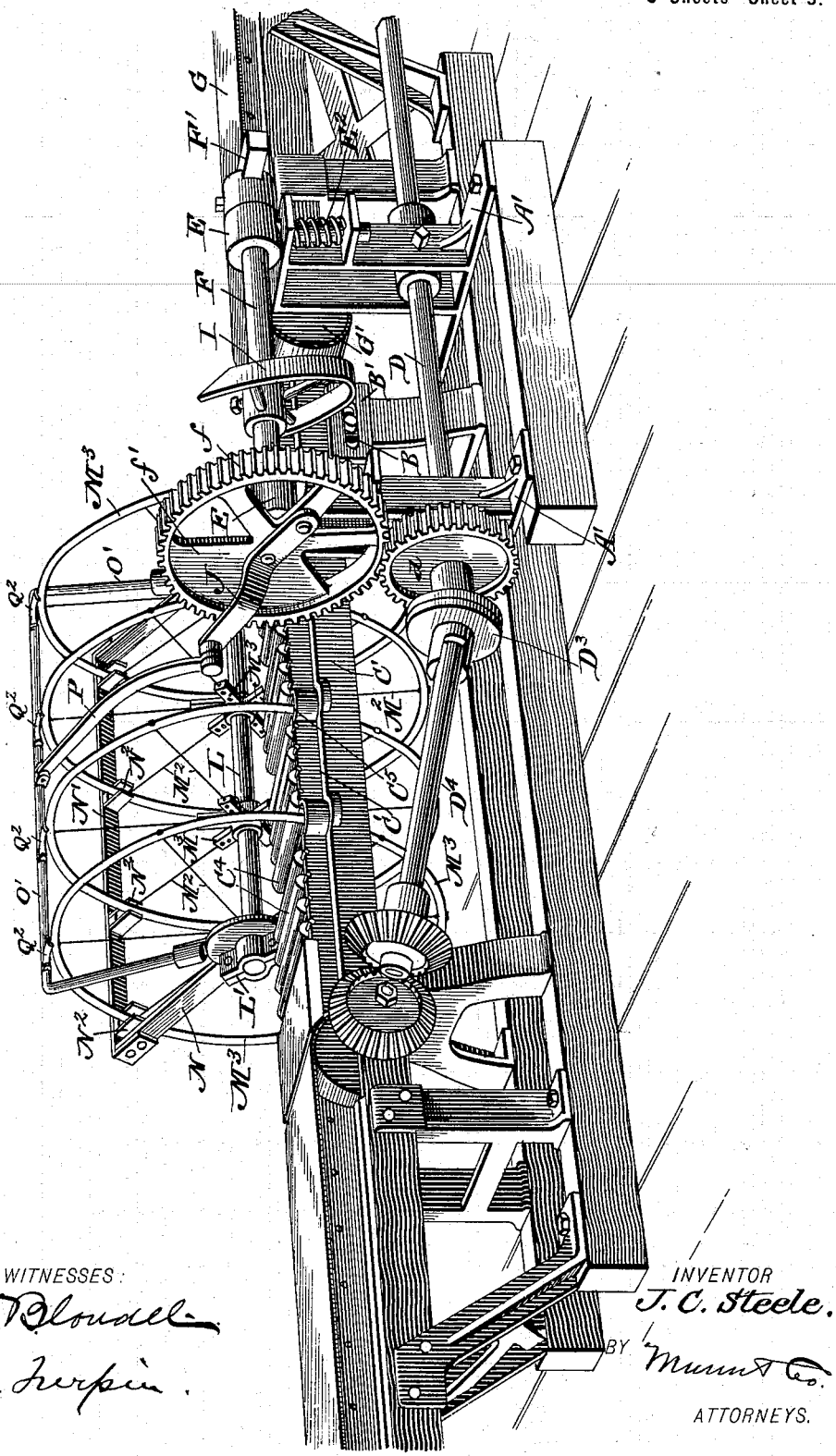
WITNESSES:
M. B. Bloudell
P. B. Turpin.
INVENTOR
J. C. Steele.
BY Munn & Co.
ATTORNEYS.

UNITED STATES PATENT OFFICE.

JAMES C. STEELE, OF STATESVILLE, NORTH CAROLINA.

BRICK-CUTTING TABLE.

SPECIFICATION forming part of Letters Patent No. 612,283, dated October 11, 1898.

Application filed September 16, 1897. Serial No. 651,841. (No model.)

*To all whom it may concern:*

Be it known that I, JAMES C. STEELE, residing at Statesville, in the county of Iredell and State of North Carolina, have invented a new and useful Improvement in Brick-Cutting Tables, of which the following is a full, clear, and exact description.

My invention is an improvement in brick-cutting tables, and particularly in that class of such machines in which the clay is fed in a continuous bar or bars to the cutting devices; and it will be understood that the improvement may be employed or readily adapted for use in cutting tiles as well as brick.

The invention relates particularly to improvements in the bed of the cutting table or carriage, improvements in the cutting-reel and the devices for operating the same, in the means for regulating the operation of the cutting devices by the passage of the clay to the cutting-table, and in the means for positively returning the table or carriage to its initial position after the cutting operation has been completed.

The invention also relates to certain other improvements; and it consists in the novel construction and combination of parts, as will be hereinafter described, and pointed out in the claims.

In the drawings, Figure 1 is a side elevation, Fig. 2 is a top plan view, Fig. 3 a cross-sectional view, and Fig. 4 is a detail plan view, illustrating the yielding bed-plate sections. Fig. 5 is a detail cross-section on about line 5 5 of Fig. 4. Fig. 6 is a detail cross-section on about line 6 6 of Fig. 4. Figs. 7 and 8 are detail views illustrating the means for securing the opposite ends of the cutting-wires, and Fig. 9 is a perspective view of the improved cutting-table.

In carrying out my invention I provide a suitable main frame having rails or tracks A for the roller-supports B of the carriage or table C. These rollers B roll freely on the rails A beneath the carriage C and are provided with extending shafts or studs $b$, which operate in the slots $b'$ of the retaining-plates B', which serve to guide the carriage in its longitudinal movement and limit such movement as desired. I also provide a framing A', in which is journaled the drive-shaft D, and which supports the bearings E for the main shaft F. The shaft D is coupled at D' with a suitably-driven shaft $D^2$ and at $D^3$ with a shaft $D^4$, which drives the off-bearing belt in the operation of the machine. This shaft D is driven constantly and is geared with the shaft F in such manner that the shaft F is moved intermittently, and means are provided whereby the motions of the shaft F are controlled by the movements of the on-feed belt G, so the operations of the shaft F will be regulated by the passage of the clay bars onto the table, as one of the functions of the shaft F is to operate the cutting-reel presently described. In the construction shown I effect this result by making the pulley G' on the shaft $G^2$ of the on-feed belt G of a circumference equal to the length of the portion of clay which is supplied to the cutting-table for each operation of the cutters, and I provide, in connection with such shaft and pulley $G^2$ G', a pin or projection $G^3$, which operates to trip a detent H, which holds the gearing of shafts F and D out of mesh and permits the same to adjust into mesh when the detent H is released by the pin $G^3$. In the construction shown the shaft D is provided with a gear-wheel $d$, which meshes with a mutilated gear $f$ on the shaft F, such wheel $f$ having a space $f'$ from which the teeth are omitted, so that when the parts are in the position shown in the end view, Fig. 3, the shaft D may continue its revolutions without moving the shaft F, as the gear $d$ operates in the space $f'$ and does not mesh with the teeth of the wheel $f$. The detent H is pivoted at $h$, is arranged at its lower end to be engaged by the tripping projection $G^3$ and at its upper end to bear beneath an arm F', projecting from the shaft F, the detent H being held in such position by a spring H' and holding the gear $f$ out of mesh with the gear $d$ until the detent is released, when the gear $f$ will by reason of its weight portion $f'$ swing downward on its side next the cutting-table, and its teeth will mesh with those of the gear $d$ to give a partial revolution to the gear $f$ and its shaft F as is desired. The bearings E are yielding, being supported by springs E' and $E^2$, the former serving to prevent breakage of the cogs if they should ride upon each other and the latter to cushion the stroke of the arm F' upon the detent-stop H. On the shaft F is fixed a cam I, which is shown as a spiral having its ends separated or spaced apart and arranged to engage a pin or projection I' on the carriage C for the purpose of forcibly returning the said carriage after the cutting operation. I also provide the shaft F with a crank J, which operates the cutting-reel, as presently described.

The cutting table or carriage has a framing composed of an unbroken side bar C', arranged on the side next the main shaft F, and the opposite side of said frame is composed of sections $C^2$, spaced apart at their ends for the passage of the cutting-wires and suitably supported and braced by cross-bars $C^3$, which extend from the side bar C' and connect with the sections $C^2$, preferably near the middles of the latter, as shown. The sections $C^2$ are provided at their ends with inwardly-projecting lugs $C^6$, which serve as stops for the bed-plate sections presently described.

Rollers $C^4$ journal in suitable bearings in the bars C' $C^2$, and the side bar C' has outwardly-swelled portions which form recesses $C^5$ for the rims or circles of the cutting devices presently described. The bed-plates K are arranged in pairs, set with their adjacent edges sufficiently apart to permit the passage of the cutting-wire between them, and these plates, when in elevated position, bear beneath the stop $C^3$ and serve to support the clay bar immediately adjacent to the cut, so the lower edge thereof will not be broken or ragged. Springs K' hold the plates K in elevated position, and yet permit them to be depressed, as may be desired. This depression of the bed-plates is important for two reasons, one of which is that it avoids the breakage of the wire in case a stone or twig should be in the clay bar across the path of the cutting-wire. Another reason is that I find it desirable to hold the bed-plates out of engagement with the clay bar except during the operation of cutting, and for this purpose I provide means, as presently described, for positively depressing the bed-plates. Such depression of the bed-plates avoids any friction therewith of the clay bar either in the passage of such bar onto the bed or carriage or in the return movement of the carriage to its starting-point.

In supporting the sections K they are provided at their ends with cranks $K^2$ $K^3$, having wrists journaled in the frame of the carriage and one of such wrists extended, forming the cranks $K^4$ $K^5$. The springs K' engage the cranks $K^4$ to hold the bed-plates elevated, while the cranks $K^5$ are engaged by portions of the cutting-wheel, which in the present instance operates as the means for holding the bed-plates depressed, and such means are preferred; but it is obvious that various means may be employed to secure this positive depression of the bed-plates for the purpose described.

The cutting-reel has a shaft L, journaled in supports L', projecting through the frame of the carriage or table. This shaft supports hubs M, having projections M', forming the inner connections for the cutting-wires $M^2$, whose outer ends are secured to the rims or circles $M^3$. In connecting the wires with the rims $M^3$, I provide the latter with tapered openings $m^2$, receiving the plugs $m^3$, which are apertured at $m^4$ to receive the outer ends of the wires. These plugs serve efficiently to connect the wires with the circles and project beyond the circles or rims to form projections for engagement by the pawls, which operate to give a step-by-step movement to the cutting-reel. At their inner ends the wires $M^2$ are secured to the turning plugs $M^4$, which fit in bearings in the projections M' and may be turned to properly tighten the wires $M^2$ and also to center the circles or rims $M^3$. I have shown the reel with four cutters or cutting-circles; but the number may be varied according to the capacity of the machine.

To guide the circles in their movements and also to operate as detents to prevent them from moving, except when operated to cut the clay, I provide guides N, having end bars secured to the arms L', and cross-bars N', provided with spring-jaws $N^2$, between which the rims $M^3$ operate and which serve to guide the said rims and also to bind them and so act as detents.

To operate the cutting-reel, I provide a swinging frame O, having a bar O', which extends alongside the several rims $M^3$ and is provided with pawls $Q^2$, arranged to engage such rims and give a step-by-step movement to the reel as the main shaft F is revolved, a pitman P connecting the crank J of the main shaft with the swinging frame O, as shown.

An oiling-roller Q is arranged at the receiving end of the carriage to lubricate the clay bars as they pass onto such carriage.

In the operation of my machine we will suppose the parts to be in the position shown in the side and end views and a bar of clay to be on the on-feed belt, with its front end over the pulley G'. The passage of such bar onto the table will revolve such pulley once and will bring the pin $G^3$ to position to trip the detent H and permit the gear $f$ to adjust into mesh with the gear $d$, when the shaft F will be turned one revolution and the cutting-reel will be operated one step to effect the cutting, and the swinging frame will be returned to starting-point. During such return movement of the swinging frame the cam I by engagement with the pin I' returns the carriage to its starting-point. During such return of the carriage one of the projections M' of the hub M is in engagement with the cranks $K^5$ of the bed-plates K and holds such plates depressed and also maintains the plates in such position during the passage of the clay bar or bars onto the bed or carriage. By this construction it will be seen I secure by the main shaft F an intermittent or step-by-step operation of the cutter-wheel and also effect a return of the carriage. It will also be seen the operation of the main shaft is controlled and regulated by the passage of the clay onto the carriage, and also that the bed-plates which support the clay to secure a square clean cut are so controlled that they do not interfere with the movement of the clay bar over the table or carriage.

The shaft, gearing, and other automatic attachments may be removed and the cutting done by hand by pulling down the reel to its proper position with one hand while the other hand controls the forward and backward movement of the table. This is important, as it will enable the operator to continue the cutting if any part of the automatic mechanism should be out of repair.

Having thus described my invention, what I claim, and desire to secure by Letters Patent, is—

1. In a machine substantially as described, the combination of the cutting devices, the main shaft for operating the same having a crank projection, means for driving such shaft, a pulley which is operated by the feed of the clay bar to the cutting devices, a pivoted detent arranged at one end to engage the crank projection of the main shaft, and a projection connected with the pulley for operating the detent whereby the operation of the cutting devices will be controlled by the on-feed of the clay bar, substantially as shown and described.

2. A machine substantially as described comprising a cutter, a carriage or table having its bed provided with rollers and between the rollers with depressible plates between which the cutter-wires pass, means by which the said plates may be held in elevated position during the cutting operation, and means by which to hold the plates depressed at other times, substantially as described.

3. In a machine substantially as described, the combination of the carriage-frame having rollers, the bed-plates depressible to a plane below that of the tops of the rollers, the cutting devices operating between said plates and provided with means engaging the same and adapted to hold them depressed after the cutting operation, substantially as described.

4. A machine substantially as described having a carriage provided at intervals with rollers for supporting the clay and between the rollers with depressible bed-plates by which to support the clay during the cutting operation and devices by which to depress said plates when the clay is moving over the carriage, substantially as described.

5. The combination of the main shaft, the cutting devices, means by which the main shaft operates the cutting devices, a drive-shaft having a gear, a mutilated gear on the main shaft, devices by which the mutilated gear is held from meshing with the gear of the drive-shaft and is released to adjust into such mesh, and a weight by which to so adjust the mutilated gear substantially as described.

6. In a machine substantially as described the combination of the cutting devices, the main shaft, means by which the main shaft operates the cutting devices, the drive-shaft, a gear on the drive-shaft, a mutilated gear on the main shaft having its mutilated portion normally opposite the drive-shaft gear, a weight by which the mutilated gear is partially turned to adjust its teeth into mesh with that of the drive-shaft gear, a detent-latch whereby the mutilated gear is held from operation by said weight, the on-feed-belt shaft and a tripping projection in connection therewith by which to release the detent-latch substantially as described.

7. In a machine substantially as described, the combination of the carriage, the cutting-reel, the main shaft, connections between the main shaft and reel, the cam on the main shaft by which to return the carriage, the mutilated gear on the main shaft, the drive-shaft having a gear arranged to mesh with the mutilated gear, the on-feed belt and its pulley and shaft having a tripping pin or projection, and detent-latch devices arranged to hold the mutilated gear from meshing with the drive-shaft and to be released by the tripping pin or projection, substantially as described.

8. In a machine substantially as described, the combination of the carriage, the shaft journaled thereto, the guide bar or frame having spring-jaws, the rims or circles passed through and engaged by the spring-jaws, the wires connecting the same with the shaft, the main shaft, the crank on said shaft, the swinging frame provided with pawls engaging the rims or circles, and connections between the said swinging frame and the crank substantially as described.

9. In a machine substantially as described, the cutting-reel having a rim or circle provided with an opening, the cutting-wire and the plug holding said wire and fitting in the opening of the circle and protruding to form a part for engagement by the pawl, and the pawl engaging said plug substantially as described.

10. In a machine substantially as described, the combination of the rim or circle having the cutting-wires, means for operating said circle, and the guide bar or frame having spring-jaws for the passage of the rim or circle, the rim or circle passing through and engaged by the spring-jaws substantially as described.

11. The combination of the carriage, the main shaft having the cam by which the carriage is returned to starting-point, devices for operating said shaft, and the clay-feeding mechanism provided with means by which the main shaft is thrown into operative connection with its operating devices, substantially as shown and described.

12. The combination of the main shaft, the drive-shaft, gearing connections between said shafts, spring-supports for the main shaft, and tripping and detent devices by which to control the engagement of the gears between the main and drive shafts, substantially as shown and described.

13. In a machine substantially as described, the combination of the carriage-frame, the bed-plates depressible to a plane below that of the carriage-bed and the cutting devices operating between said plates and provided with means by which to hold the plates depressed after the cutting operation substantially as set forth.

14. The combination of the table, the cutting-reel having the circles or rims and the wires and supporting-shaft, the swinging frame having a cross-bar which extends over the several rims or circles and has pawls engaging the same, the main shaft connected with and operating said swinging frame, and devices whereby the main shaft is operated at intervals substantially as described.

15. The combination of the carriage, the depressible bed-plates, springs for holding the said plates normally elevated, and the cutting-reel having the hub portions arranged to engage and depress the bed-plates after the cutting operation, substantially as described.

16. In a machine substantially as described, the combination of the rim or circle supporting the cutting-wires and a guide-frame therefor having frictionally-operating devices embracing the rim or circle for preventing the accidental movement of said rim or circle in either direction, substantially as described.

17. The combination of the carriage or table frame, and the bed-plate sections having at their opposite ends crank portions journaled to the frame and provided at one end beyond said crank portions with cranks $K^4$ and with springs engaging therewith, substantially as described.

18. The combination of the carriage or table frame, the bed-section having cranks journaled to said frame and reversely-projected cranks $K^4$ $K^5$, springs connected with cranks $K^4$, and the depressing means engaging the cranks $K^5$ substantially as described.

19. In a machine substantially as described, the combination of the cutting devices, the feeding devices, the main shaft connected with the cutting devices the yielding bearings for said main shaft the drive-shaft and gearing between the main and drive shafts substantially as shown and described.

JAMES C. STEELE.

Witnesses:
GED H. BROWN,
JOHN W. GUY.